United States Patent Office 2,824,127
Patented Feb. 18, 1958

2,824,127

PROCESS FOR THE PREPARATION OF META DIALKYLAMINOBENZOIC ACIDS

Paul D. Dreyfuss, Cincinnati, Ohio, assignor to Toms River-Cincinnati Chemical Corporation, a corporation of Delaware No Drawing. Application February 21, 1955
Serial No. 489,765

6 Claims. (Cl. 260—518)

The present invention relates to improvements in the manufacture of meta dialkylaminobenzoic acids.

One method heretofore employed in the manufacture of meta dialkylaminobenzoic acids consists in the alkylation of meta aminobenzoic acid (I) with an alkylating agent, to produce the meta dialkylaminobenzoic acid (III, R=alkyl). However, considerable amounts of meta monoalkylaminobenzoic acid (II) and of the "betaine" (IV) form at the same time. These products must be separated by cumbersome methods, and the yield of meta dialkylaminobenzoic acid obtainable in this way is low.

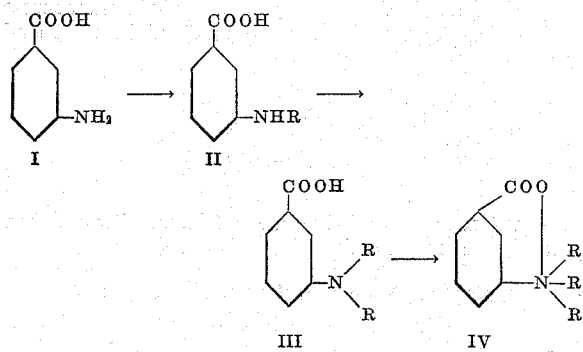

Another method consists in treating one of the products I or II with an excess of alkylating agent whereby the "betaine" IV is obtained. This is isolated as the iodide and converted to the ester of dialkylaminobenzoic acid which is then saponified to yield the desired product III. This method is cumbersome, and the necessity of isolating the "betaine" as iodide makes this method very expensive.

A third method consists in treating meta nitrobenzoic acid with formaldehyde and hydrogen in the presence of a palladium catalyst. This method gives excellent yields but requires expensive equipment and cannot be recommended for the production of meta dimethylaminobenzoic acid on a large scale.

A primary object of the present invention is the embodiment of a method of preparing meta dialkylaminobenzoic acids of Formula III, which method is free of the afore-outlined defects of the prior art procedures.

This object is realized by the present invention, according to which, briefly stated, the "betaine" IV is converted directly to meta dialkylaminobenzoic acid by transalkylation, that is by treating the "betaine" with an acceptor for alkyl groups such as ammonia. In this reaction it is not necessary to isolate the "betaine," and the meta dialkylaminobenzoic acid is obtained in high yield and purity.

More particularly, and referring to the reaction scheme, supra, the process according to this invention comprises treating meta aminobenzoic acid I with an alkylating agent such as methyl sulfate, ethyl sulfate, propyl bromide and the like, in the presence of an acid acceptor such as sodium acetate, sodium carbonate, sodium hydroxide and the like until the solution is essentially free from compounds, such as the compounds I and II, which react with nitrous acid. The solution, containing a mixture of compounds III and IV and some alkyl ester of III (R standing for a lower alkyl group such as methyl, ethyl, propyl and the like), is treated e. g. with ammonia, preferably in a closed vessel at elevated temperature, e. g. between 80 and 200° C. Thus, for example, preparation of the dimethyl compound requires about 2 hours at a temperature of about 140° C. From the reaction mixture which contains ammonia, methylamines, inorganic salts and the sodium salt of compound III, the latter can be isolated by acidification. The same result is obtained if the ammonia is replaced by another compound which is easily alkylated such as hydrazine or a primary organic amine, for example, a lower monoalkylamine, such as monomethylamine and the like. Among these alkyl acceptors ammonia is, however, generally preferred.

The meta dialkylaminobenzoic acids of the present invention are useful inter alia as dyestuff intermediates. Thus, they may be employed in the preparation of 2,6-tetralkyldiaminoanthraquinones (2) according to the following scheme:

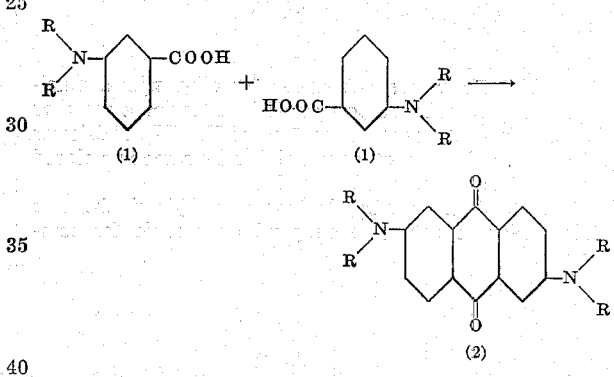

the condensation being facilitated by the presence of an acid condensing agent, and/or by the use of acid chlorides of the reactants (1). R here has the precedingly-recited significance. The compounds (2) dye wool from an acid bath, and can be converted by treatment with sulfonating agents to form other valuable wool dyes.

The following examples set forth, solely by way of illustration, represent presently-preferred embodiments of the invention. In such examples, the parts are parts by weight unless otherwise stated; and the temperatures are in degrees centigrade. The relationship between parts by weight and parts by volume is the same as that between grams and milliliters.

*Example 1*

189 parts of sodium meta nitrobenzoate are reduced with iron and hydrochloric acid. The reaction mixture is made alkaline by addition of soda ash (sodium carbonate) and filtered. The filtrate (850 parts by volume) is stirred at a temperature of 10–15°, and 440 parts of methyl sulfate are slowly added while the solution is kept neutral by the simultaneous addition of soda ash.

170 parts of ammonia (or a corresponding quantity of aqueous ammonia) are then added, and the mixture is heated in an autoclave for 3 hours at 140°. After cooling to room temperature (about 20–30°), the solution is diluted to dissolve inorganic salts which might have precipitated, and sulfuric acid is added until the product starts to precipitate. The precipitation is completed by the addition of 60 parts of acetic acid. The product is filtered, and washed with 1000 parts of cold water. 155 parts of meta dimethylaminobenzoic acid are obtained.

Example 2

If, while otherwise proceeding as set forth in the foregoing example, the ammonia is replaced by an equivalent quantity of monomethylamine, the same yield of meta dimethylaminobenzoic acid is obtained.

Example 3

137 parts of meta aminobenzoic acid are treated with ethyl sulfate in weakly alkaline solution at 40° until a sample, acidified with hydrochloric acid no longer reacts with sodium nitrite. The solution is then brought to pH 4.5 by addition of sulfuric acid, and the resultant precipitate is filtered, washed and dried. 69 parts of meta diethylaminobenzoic acid are obtained.

However, if the ethylated solution before the addition of sulfuric acid is mixed with 170 parts by weight of ammonia and heated for 6 hours to 180–185° C., 158 parts of meta diethylaminobenzoic acid are obtained.

Having thus disclosed the invention, what is claimed is:

1. A method of preparing meta dialkylaminobenzoic acid, which comprises reacting together compounds corresponding to the formula

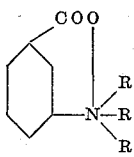

and R'—NH$_2$, wherein R stands for alkyl with a maximum of two carbon atoms and R' stands for a member selected from the group consisting of H, NH$_2$, and lower alkyl by heating a mixture containing the same in a closed vessel to a temperature of 80 to 200° C.

2. A method of preparing meta dialkylaminobenzoic acid, which comprises reacting with ammonia the compound

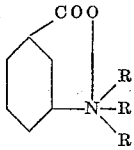

where R stands for alkyl with a maximum of two carbon atoms by heating a mixture containing the same in a closed vessel to a temperature of 80 to 200° C.

3. A method of preparing meta dimethylaminobenzoic acid, which comprises reacting with ammonia the compound

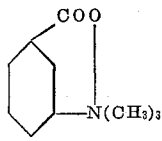

by heating a mixture containing the same in a closed vessel to a temperature of 80 to 200° C.

4. A method of preparing meta diethylaminobenzoic acid, which comprises reacting with ammonia the compound

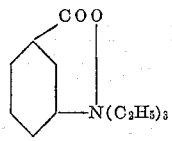

by heating a mixture containing the same in a closed vessel to a temperature of 80 to 200° C.

5. A method of preparing meta dialkylaminobenzoic acid, which comprises heating a reaction mixture with ammonia in a closed vessel to a temperature of 80 to 200° C., said reaction mixture containing the betaine of said acid and being obtained by subjecting meta aminobenzoic acid to the action of an alkylating agent, the alkyl group which contains a maximum of two carbon atoms, until the solution is essentially free from said aminobenzoic acid and from its monoalkyl derivative.

6. A method of preparing meta dialkylaminobenzoic acid which comprises heating ammonia and the compound

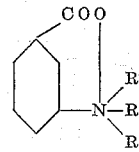

where R stands for alkyl with a maximum of two carbon atoms, to a temperature of 80 to 200° C.

References Cited in the file of this patent

UNITED STATES PATENTS 2,458,328   Adams _____ Jan. 4, 1949

OTHER REFERENCES

Wagner et al.: Synthetic Organic Chemistry, page 667 (1953).

Challenger et al.: Chemical Society Journal, pages 48, 49, 51 and 55 (1942).